(12) United States Patent
Haberstroh (10) Patent No.: US 8,442,884 B2
(45) Date of Patent: May 14, 2013

(54) TRANSFER OF TITLE THROUGH INTERMEDIARY

(75) Inventor: Martin Haberstroh, Danville, CA (US)

(73) Assignee: The Western Union Company, Englewood, CO (US)

(*) Notice: Subject to any disclaimer, the term of this patent is extended or adjusted under 35 U.S.C. 154(b) by 964 days.

(21) Appl. No.: 11/771,758

(22) Filed: Jun. 29, 2007

(65) Prior Publication Data

US 2009/0006248 A1 Jan. 1, 2009

(51) Int. Cl.
*G06Q 40/00* (2012.01)

(52) U.S. Cl.
USPC .............................................. 705/35; 705/36

(58) Field of Classification Search ............ 705/35, 705/36

See application file for complete search history.

(56) References Cited

U.S. PATENT DOCUMENTS

| | | | | |
|---|---|---|---|---|
| 2002/0029194 A1* | 3/2002 | Lewis et al. | ...................... | 705/39 |
| 2002/0169640 A1* | 11/2002 | Freeland | ............................ | 705/4 |
| 2007/0226131 A1* | 9/2007 | Decker et al. | ................... | 705/38 |
| 2007/0282738 A1* | 12/2007 | Highbloom | ..................... | 705/38 |
| 2008/0281649 A1* | 11/2008 | Morris | .............................. | 705/7 |

* cited by examiner

*Primary Examiner* — Eric T. Wong
*Assistant Examiner* — John Anderson
(74) *Attorney, Agent, or Firm* — Kilpatrick Townsend & Stockton, LLP (57) ABSTRACT

Disclosed are novel tools (including, without limitation, systems, methods and software) to facilitate the sale of items of property and/or for providing title transfer services that ensure that the purchaser of the items of property (real or personal) receives adequate title to the property. In an aspect, the tools can serve as a clearinghouse for the various components to the transaction (e.g., receiving payment from the buyer, confirming that any security interest in the property has been paid off, informing the various parties to the transaction of the transaction's status, etc.).

30 Claims, 6 Drawing Sheets

TRANSFER OF TITLE THROUGH INTERMEDIARY

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to financial transactions in general and, more particularly, to financial transactions in which title to personal or real property is transferred through the use of an intermediary.

BACKGROUND

In any sale of property, and in particular property in which simple possession does not necessarily imply ownership, the purchaser is concerned about obtaining proper title to the purchased property. In the sale of real property, this concern is normally addressed through the use of a title insurance company, which generally handles the closing transaction for the sale, as well as ensuring that the seller passes clean title to the buyer in the sale. In the context of other items of property, however, use of a title insurance company may be unnecessary, and in fact often renders the sale transaction unduly burdensome and expensive.

Nonetheless, there are some items of personal property for which the purchaser would like to ensure that the purchaser is receiving clear title in conjunction with the purchase. An example of such item is a vehicle, because of the relatively high intrinsic value of vehicles, the relatively high probability that a vehicle that will be encumbered with a security interest, and the titling requirements of most jurisdictions, the implication of which is that merely exchanging possession of the vehicle from seller to purchaser does not necessarily transfer ownership of the vehicle.

In transactions in which the purchaser requires a loan to purchase the vehicle, the purchaser's lender (e.g., a bank, credit union, etc.) may have an interest in ensuring that the purchaser receives clean title and therefore may impose requirements to that effect on the transaction. On the other hand, if the purchaser wishes to pay cash for the vehicle, there is no entity involved in the transaction to ensure that the purchaser is receiving clean title as part of the transaction. In many cases, the purchaser him- or herself may be able to impose requirements upon the seller to ensure that the vehicle is unencumbered prior to paying for the vehicle, but many purchasers lack the sophistication to impose such requirements, and even if the purchaser does have the requisite sophistication, such requirements may be burdensome for both the purchaser and seller, and may in fact unnecessarily delay the transaction.

Hence, there is a need for tools to facilitate the sale of property (including, but not limited to, items of personal property, such as vehicles), especially where there is some question about the purchaser receiving clean title to the property. Ideally, such tools would enhance, rather than detract from, the ease and/or efficiency of the transaction, while ensuring that the purchaser does in fact receive clean title to the property.

BRIEF SUMMARY

Embodiments of the invention provide novel tools (including, without limitation, systems, methods and software) to facilitate the sale of items of property and/or for providing title transfer services that ensure that the purchaser of an item of property (real or personal) receives adequate title to the item. In an aspect, the tools provided by the invention can serve as a clearinghouse for the various components to the transaction (e.g., receiving payment from the buyer, confirming that any security interest in the property has been paid off, informing the various parties to the transaction of the transaction's status, etc.). In another aspect, the tools provided by the invention can be implemented with relatively low overhead (as compared to the use of a title insurance company, for example), from both an administrative standpoint and a financial standpoint.

Certain embodiments employ a money transfer service to facilitate the transfer of title. Advantageously, this provides a convenient and trusted mechanism for the purchaser to provide payment to the seller and/or for the seller to provide payment to the holder of any security interest in property (e.g., in order to clear the title to the property). Moreover, the use of the money transfer service, while not required by the invention, provides the additional benefit of an established payment network, which mitigates the overhead and/or fees that must be imposed to pay for the service.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

An exemplary method of facilitating the sale of an item may be performed by a title transfer service provider (which might be, but is not limited to, a registered money transfer service provider) in a relationship between a seller of an item, a security holder that holds a security interest in the item, and a purchaser of the item. The item to be sold can be any of a variety of items, including without limitation a vehicle, an item of personal property, a parcel of real property, and/or the like.

In one embodiment, the method includes receiving, at a computer, an enrollment transaction from the seller. In some cases, the enrollment transaction may be received via a web server interface, a telephone interface, and/or the like; hence, in some embodiments, the method may comprise providing one or more such interfaces for communication between the computer and various parties to the transaction (e.g., the seller, the purchaser, and/or the security holder). In an aspect, the enrollment transaction may comprise a set of data about an amount owing related to the security interest on the item (such as, for example, an identification of the security holder and/or an account number associated with the amount owing) and/or a set of identifying information about the item, the seller, etc. Based on the enrollment transaction, a sale transaction record, which is associated with the item, may be created (e.g., by the computer system).

In some embodiments, the method further comprises receiving, e.g., at the computer, a notification from the seller that a sale of the item is pending and/or determining, at the computer, a payoff amount for the security interest. In some embodiments, determining a payoff amount might comprise obtaining from the security holder an estimate of the payoff amount. In other embodiments, determining a payoff amount might comprise calculating the payoff amount at the computer. Merely by way of example, the computer might obtain (from the security holder, from the seller, etc.) an indication of an amount remaining of the amount owing, as of a specified date. The computer might then calculate the payoff amount based on the amount remaining, a sale closing date (which might be provided by the seller and/or the purchaser) and/or an interest rate associated with the security interest. The method may further comprise communicating with the seller regarding the payoff amount.

The notification from the seller may include an indication of an agreed sale price for the item, and/or the computer may determine whether the payoff amount is greater than sale price. If it is determined that the payoff amount is not greater than sale price, the method may include receiving, at the computer, funds from the purchaser. In some cases, an interface (such as a web server interface, a telephone interface, etc.) is provided for the purchaser to provide information for the computer to obtain the funds. Hence, in an exemplary embodiment, receiving the funds might comprise receiving, at the computer, a money transfer transaction, a credit/debit cards transaction, an electronic fund transfer via an ACH, and/or a data entry from a representative indicating that funds were received (e.g., as cash and/or any of the above payment options) from the purchaser.

If it is determined that the payoff amount is greater than sale price, the method may comprise placing the sale transaction record in a suspended status, such that the funds cannot be received from the purchaser until the transaction record has been taken out of the suspended status. The method may then further comprise receiving confirmation that the payoff amount has been reduced to an amount not greater than sales price and/or, in response, removing the suspended status from the sale transaction record. In an aspect, a determination that the payoff amount is not greater than sale price may be based on this confirmation.

Upon receiving the funds from the purchaser, at least a first portion of the funds may be transferred to the security holder. The method may further include notifying the seller that title to the item should be transferred to the purchaser. This notification might simply comprise the transfer of a second portion of the funds to the seller.

In a particular embodiment, the method comprises receiving, at the computer, a notification from the purchaser about the status of title to property. If the notification indicates that title to the item has been transferred to the purchaser, the method may comprise placing the sales transaction record in a closed status. On the other hand, if the notification indicates that title to the item has not been transferred to the purchaser, the method optionally can include recording a lien on the item, holding some or all of the purchaser's payment in escrow, and/or the like.

Another set of embodiments provides methods of facilitating a sale of a vehicle. Such methods may be performed in a relationship between a seller of the vehicle, a lender that holds a security interest in the vehicle and a purchaser of the vehicle. An exemplary method comprises providing a web server interface in communication with a computer; the web server interface may be configured to receive communications from the seller and/or the purchaser.

The method might further comprise receiving, at the computer and via the web server interface, an enrollment transaction from the seller. The enrollment transaction comprises, in an aspect, a set of data about a loan related to the security interest on the vehicle. In another aspect, the set of data comprises an identification of the lender and/or an account number associated with the loan. Based on the enrollment transaction, a sale transaction record associated with the vehicle may be created, and/or a transaction identifier associated with the sale transaction record may be provided to the seller, e.g., via the web server interface.

In some embodiments, the method comprises requesting, from the lender, information about a remaining amount of the loan. The method might further comprise receiving, at the computer, the information about the remaining amount of the loan. This information can be used, for example, to determine a payoff amount for the loan.

In an aspect, the method comprises receiving, at the computer and via the web server interface, a notification from the seller that a sale of the vehicle is pending. The notification might comprise the transaction identifier, a sale price, and/or a closing date for the sale. The computer system might determine, based on the transaction identifier, that the notification pertains to the sale transaction record. Accordingly, a loan payoff amount may be calculated at the computer, based at least in part on the remaining amount of the loan and the closing date of the sale. This loan payoff amount can be communicated to the seller, if desired.

In accordance with one embodiment, the method further comprises determining whether the loan payoff amount is greater than the sale price. If so, the method might comprise placing the sale transaction record in suspended status until receiving confirmation from the lender that the loan remaining amount is less than the sale price.

The method might comprise receiving, at the computer (e.g., via the web server interface), a request from the purchaser to make a payment. In some cases, the request includes the transaction identifier. Based on this transaction identifier, it can be determined that the request pertains to the sale transaction record. If the sale transaction record is not in suspended status, the method might include providing, e.g., through the web server interface and/or any other appropriate interface, a facility for the purchaser to initiate a money transfer transaction through a money transfer service (which might be provided by the title transfer service itself) to provide funds for the sale of the vehicle.

Once the funds are received at the computer, a first portion of the funds may be transferred to the lender, and a second portion of the funds are transferred to the seller. The method, then, might further comprise notifying the seller that title to the vehicle should be transferred to the purchaser. Upon receiving a notification from the purchaser about a status of title to the vehicle, a lien might be recorded on the vehicle, if the notification from the purchaser indicates that the title to the vehicle has not been transferred.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

While various aspects of the invention have been summarized above, certain exemplary embodiments of the invention are described in further detail below. It should be noted that the embodiments discussed herein are intended only to be exemplary and are provided for illustrative purposes, and that they are not intended, nor should they be interpreted, to be exhaustive or limiting descriptions of the invention. While various embodiments are described herein, one skilled in the art should appreciate that various components, processes and/or features described with respect to one embodiment easily can be incorporated within other embodiments. Similarly, while various alternatives and/or optional components, processes and/or features may be described, it should be understood that the invention can, in various embodiments, omit and/or substitute components, processes and/or features as appropriate.

Embodiments of the invention are designed to be implemented by a title transfer service to facilitate the sale of an item and/or the transfer of title to that item. As used herein, the term "title transfer service" (or "title transfer service provider") means any entity and/or facility that operates to facilitate the transfer of title, in accordance with embodiments of the invention described herein. Such entities and/or facilities can include, without limitation, personal and/or commercial money transfer providers (which, in some cases, may be licensed by and/or registered with one or more governmental authorities as a money transfer service), bill payment service providers, financial institutions, classified advertising providers, online auction sites, and/or the like.

Embodiments of the invention can be used facilitate the sale and/or transfer of title of many different types of property, including without limitation, real property and/or various items of personal property, such as vehicles, securities, intellectual property rights, software licenses, jewelry, and/or the like (including, without limitation, any type of assets against which a creditor might file and/or record a lien, financing statement (e.g., a UCC-1 statement), and/or the like). (As used herein, the term "item" refers to any such property, unless indicated otherwise.) Advantageously, particular embodiments of the invention can be used to facilitate the sale of items to which title is encumbered in some fashion by a security interest (e.g., by a security interest arising out of a loan, by a lien, and/or the like). In an aspect, the tools of the invention allow the purchaser of an item to ensure that the purchaser is receiving clean title to the item from the seller of the item.

In particular, embodiments of the invention can allow this process to be performed relatively efficiently and/or inexpensively, without the need to involve a title insurance company, a bank, and/or like to accomplish the transaction. Hence, tools provided by certain embodiments can be particularly helpful for purchasers who wish to pay cash (as opposed to requiring a loan) to purchase an item, because the purchaser need not involve any third parties (which would otherwise be unnecessary to the transaction) simply to ensure that the purchaser is receiving clear title to the item. Likewise, the tools provided by various embodiments benefit the seller as well, because they provide the assurance desired by the purchaser, without requiring the seller to engage in burdensome procedures merely to confirm to the purchaser that clear title will be transferred in the sales transaction.

Figure 1:
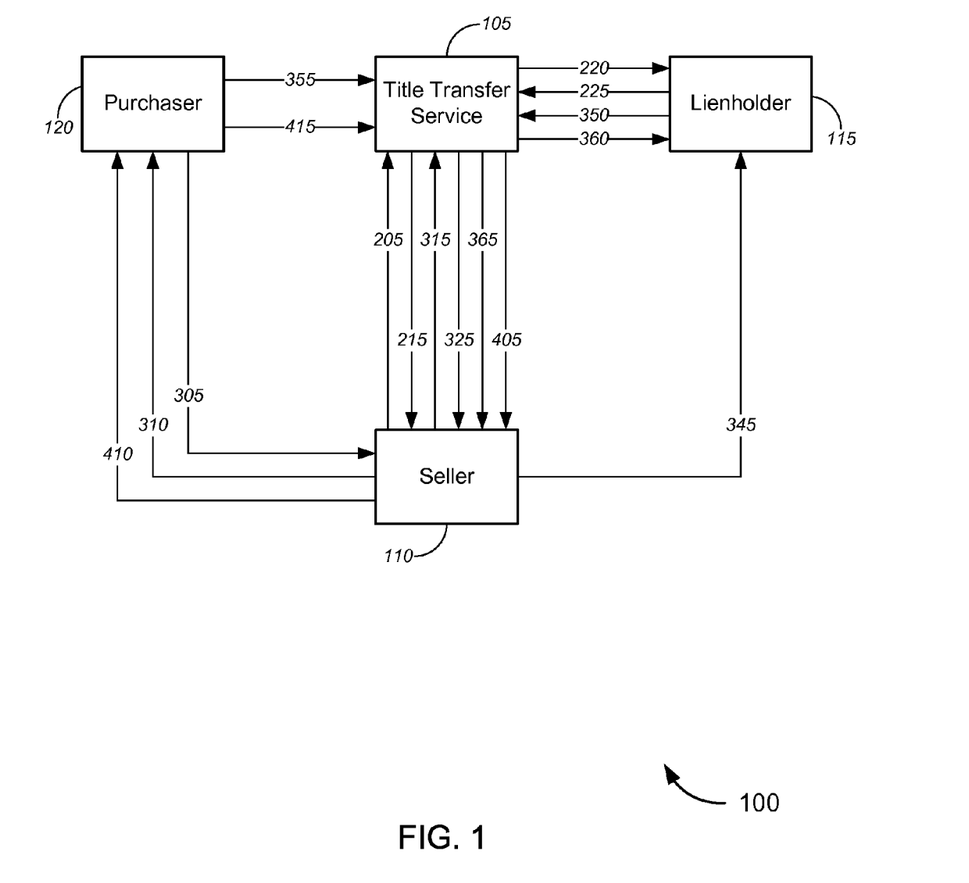
FIG. 1 is a block diagram illustrating relationships between various parties to transfer title to property, in accordance with various embodiments of the invention.

FIG. 1 illustrates an exemplary relationship 100 between various parties to a sales transaction, in accordance with one set of embodiments of the invention. A title transfer service 105 serves as an intermediary between a seller 110 of an item, a holder 115 of a security interest in the item, and a purchaser of the item 120. (For ease of reference, the term "lienholder" is used frequently herein to describe the holder 115 of the security interest, although it should be appreciated that the term "lienholder" is used broadly and should not be read to indicate that the security interest held by the holder 115 necessarily must take the form of a lien.) The arrows on FIG. 1 represent communications and/or transactions between various parties to the sales transaction, and they are described in more detail below with respect to the methods illustrated by FIGS. 2-4.

Figure 5:
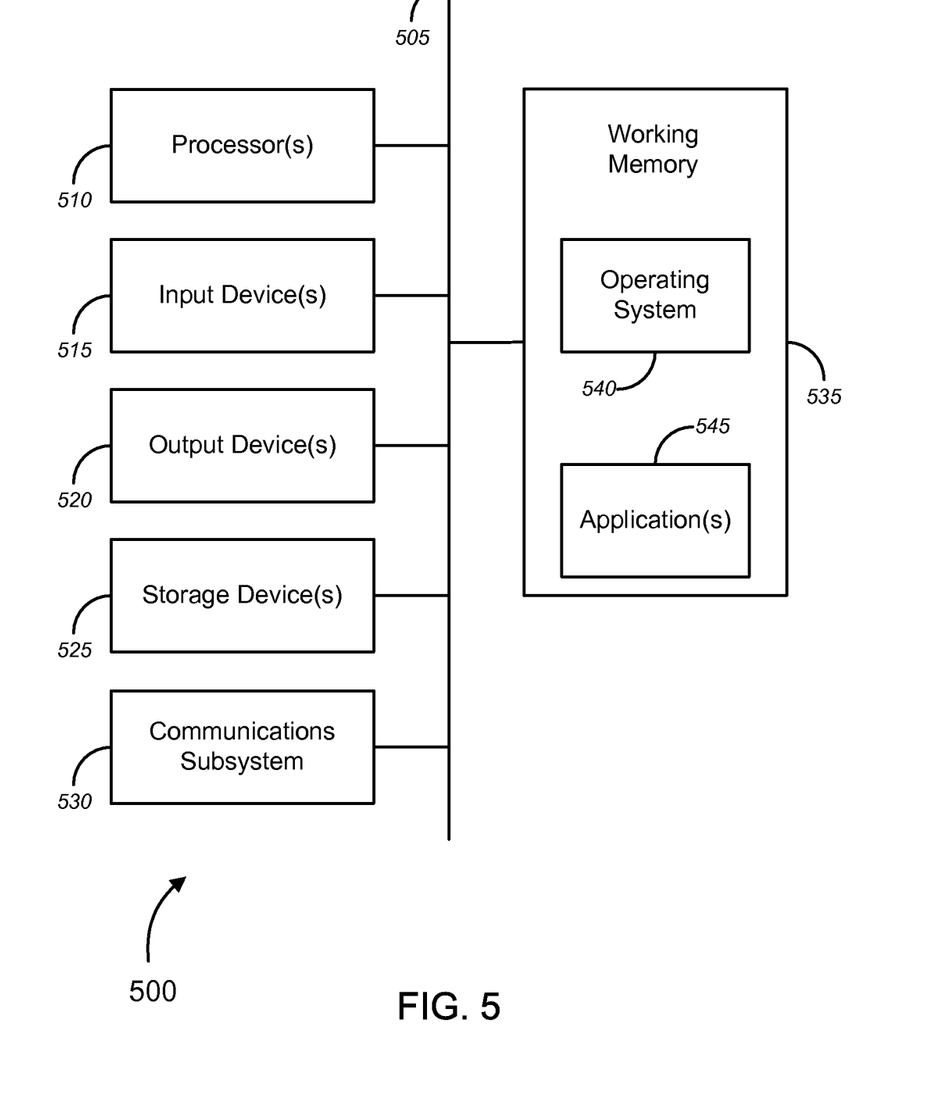
FIG. 5 is a generalized schematic diagram of a computer system that can be used in accordance with various embodiments of the invention.
Figure 6:
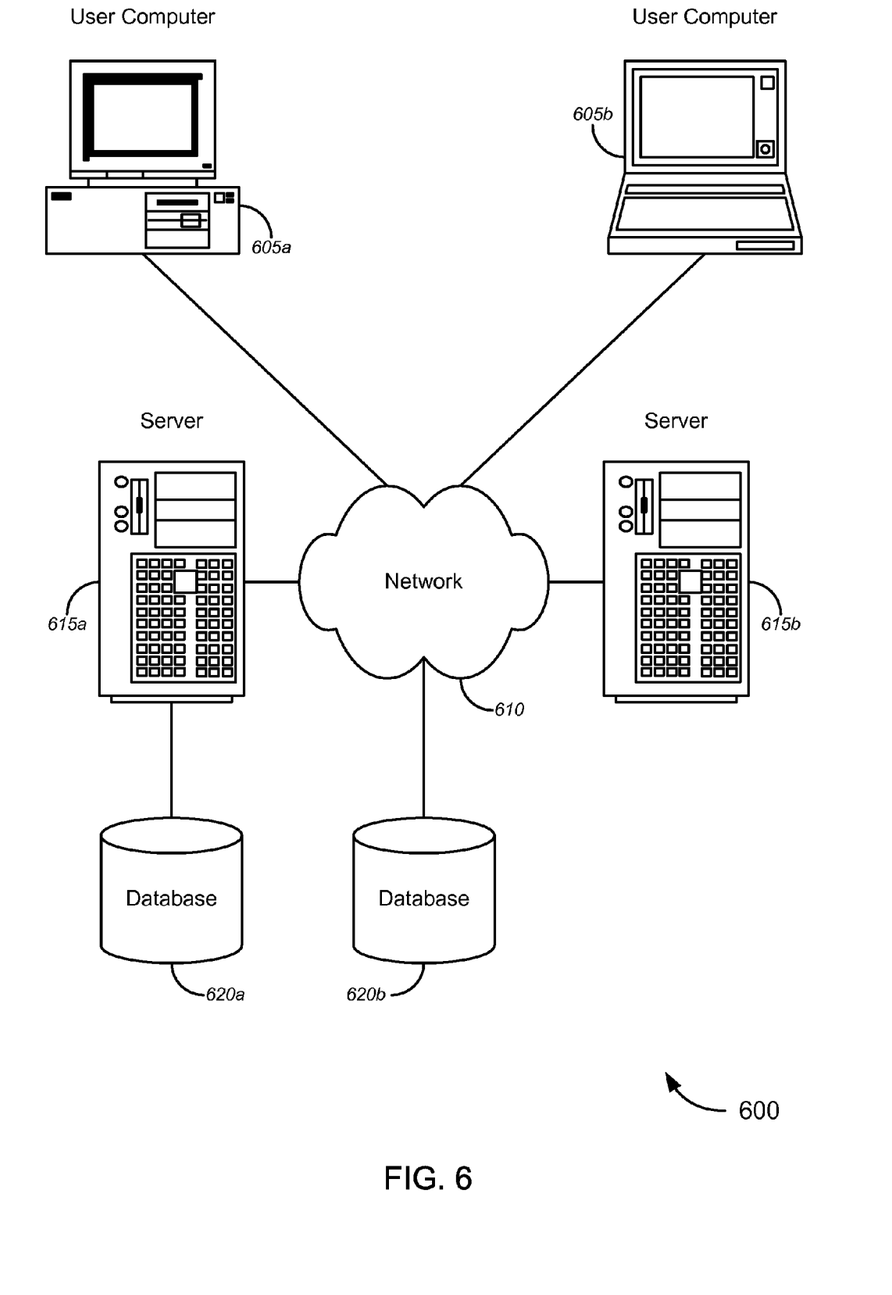
FIG. 6 is a generalized schematic diagram of a networked system of computers that can be used in accordance with various embodiments of the invention.

The title transfer service 105 comprises and/or operates a computer system (examples of which are described in more detail by FIGS. 5 and 6) that stores information about various sale transactions (and/or transactions in which title to an item is transferred). In some cases, the computer system serves as (and/or is in communication with) a "host" computer system that is capable of processing financial transactions, such as money transfer transactions, transactions through an automated clearinghouse ("ACH"), card transactions (including without limitation credit card transactions, debit card transactions, prepaid card transactions, and/or stored value card transactions), and/or the like. (Such transactions may be accommodated online, over the telephone, via a representative, at a kiosk, from a mobile device, etc.) One skilled in the art will appreciate, based on the disclosure here, that a variety of configurations are possible. Merely by way of example, in some embodiments, a computer system might comprise one or more mainframe computers, minicomputers, server computers, and/or the like. FIGS. 5 and 6, described below, illustrate various exemplary arrangements that can be used for the computer system (and other computers), in accordance with embodiments of the invention.

The computer system generally will include or more interfaces for communication with the other parties to the transaction. Merely by way of example, the computer system might comprise (and/or be in communication with) a web server that provides a web server interface (i.e., an interface with other computers via HTTP and/or other web protocols) to serve web pages for communicating with the seller 110, purchaser 120 and/or lienholder 115. Thus, for example, the web server interface might provide a web page to allow the seller 110 of an item to provide information regarding the transaction to the computer system, to inform the seller 110 of the status of the transaction, etc. The computer system might also include other computer interfaces, such as an email interface to communicate with various parties to the transaction, and/or one or more interfaces to communicate with the lienholder 115 (and/or a computer operated by the lienholder 115), such as a database connection, an extensible markup language ("XML"), web service, and/or simple object access protocol ("SOAP") interface, an application programming interface ("API"), and/or the like. There are a variety of such computer interfaces known in the art, and any of such interfaces may be used in accordance with various embodiments of the invention.

Alternatively and/or additionally, the computer system might include a telephone interface (which might include a voice recognition unit ("VRU") and/or might be configured to process dual tone multi frequency ("DTMF") tones, etc.) to provide communication between the computer system and the seller 110, purchaser 120 and/or lienholder 115. In other embodiments, an employee and/or representative of the title transfer service 105 might serve as an interface between various parties to the transaction and the computer system (e.g., by taking information from the seller 110, purchaser 120 and/or lienholder 115—in person, by telephone, etc.— and inputting that information into the computer system via a client computer, terminal, point of sale device, etc.). Other interfaces are possible as well.

Figure 2:
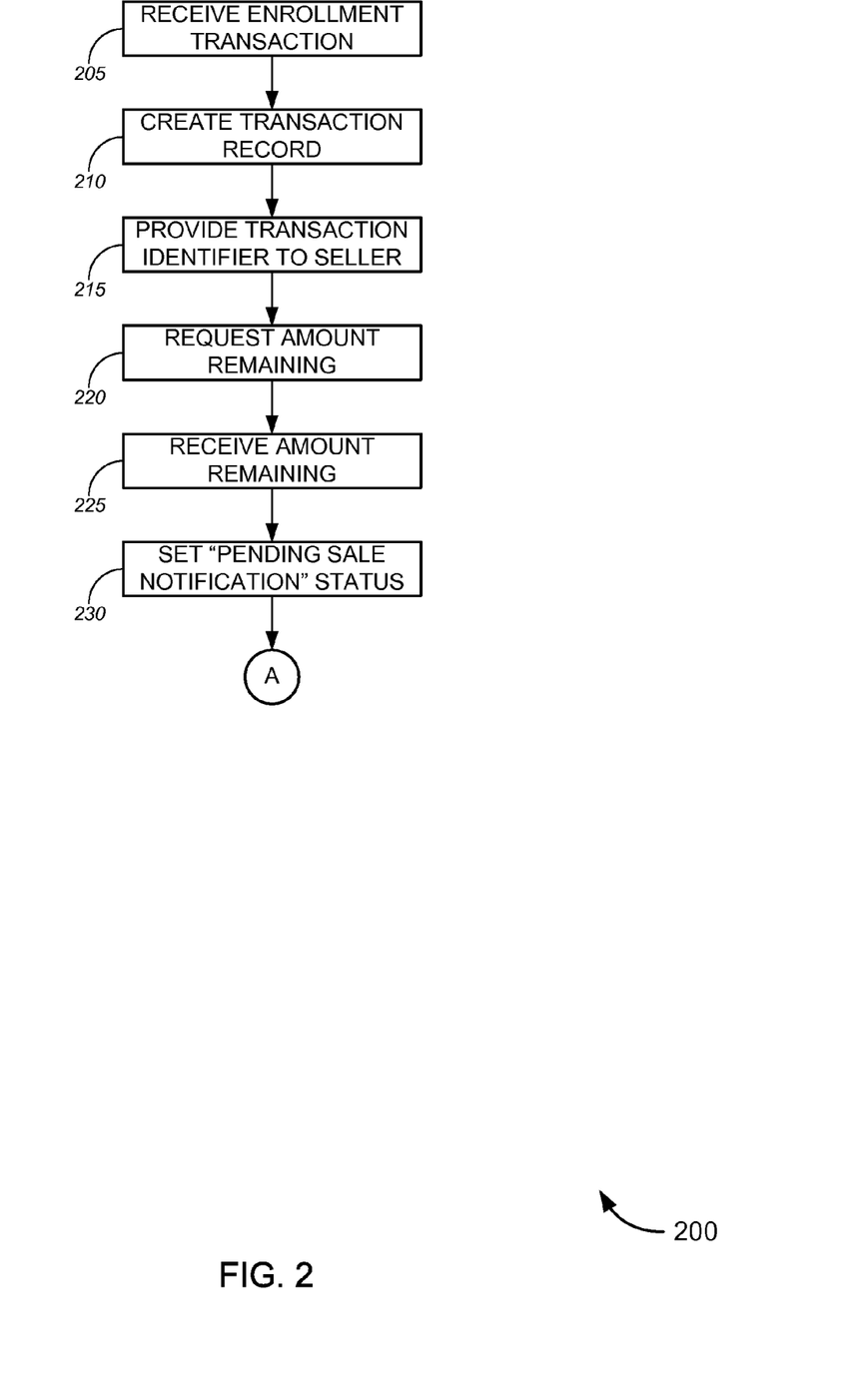
FIG. 2 is flow diagram illustrating a method of setting up a sales transaction record for providing title transfer services, in accordance with various embodiments of the invention.
Figure 3:
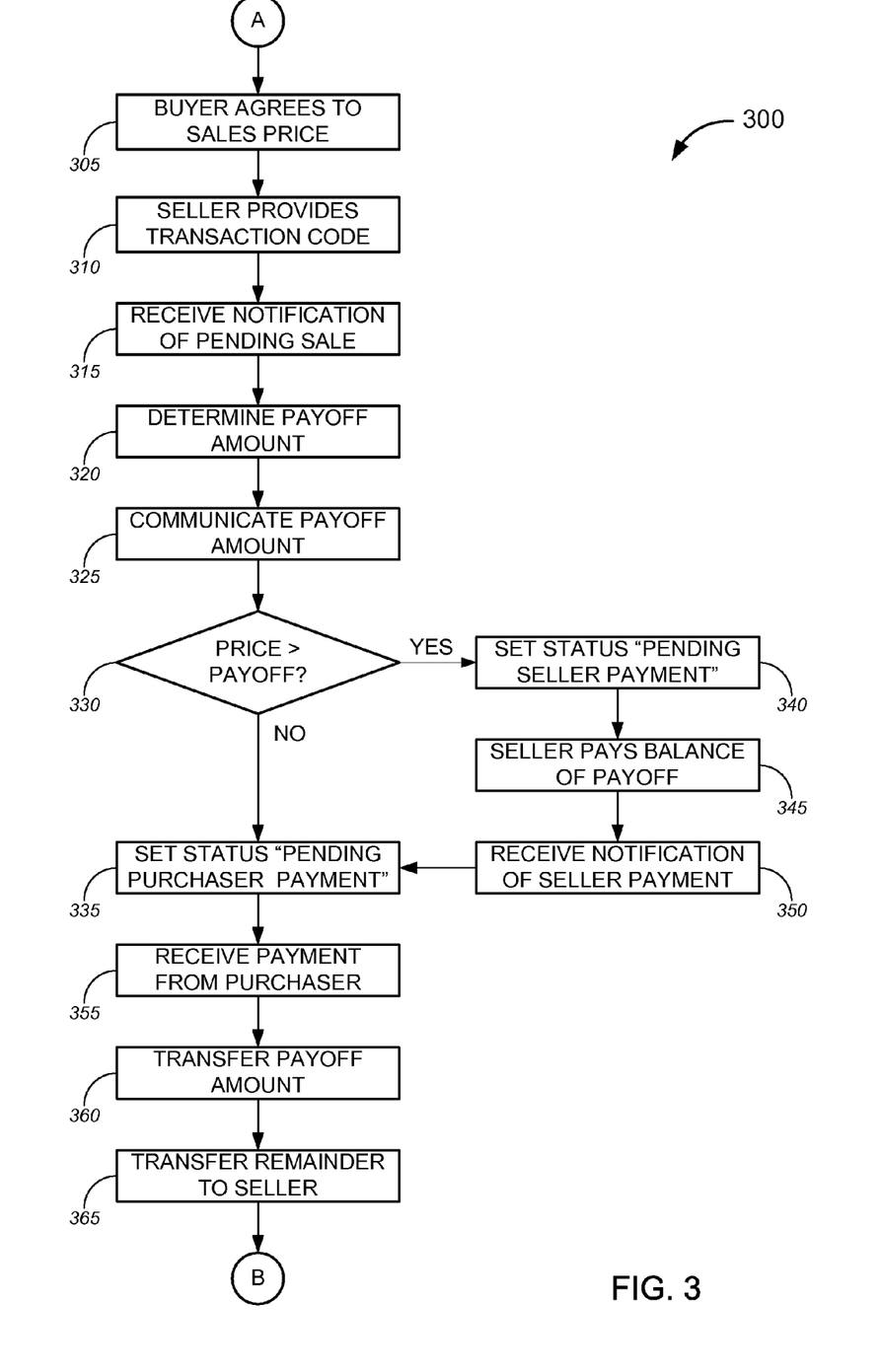
FIG. 3 is a flow diagram illustrating a method of facilitating a sales transaction and/or the transfer of title to an item, in accordance with various embodiments of the invention.
Figure 4:
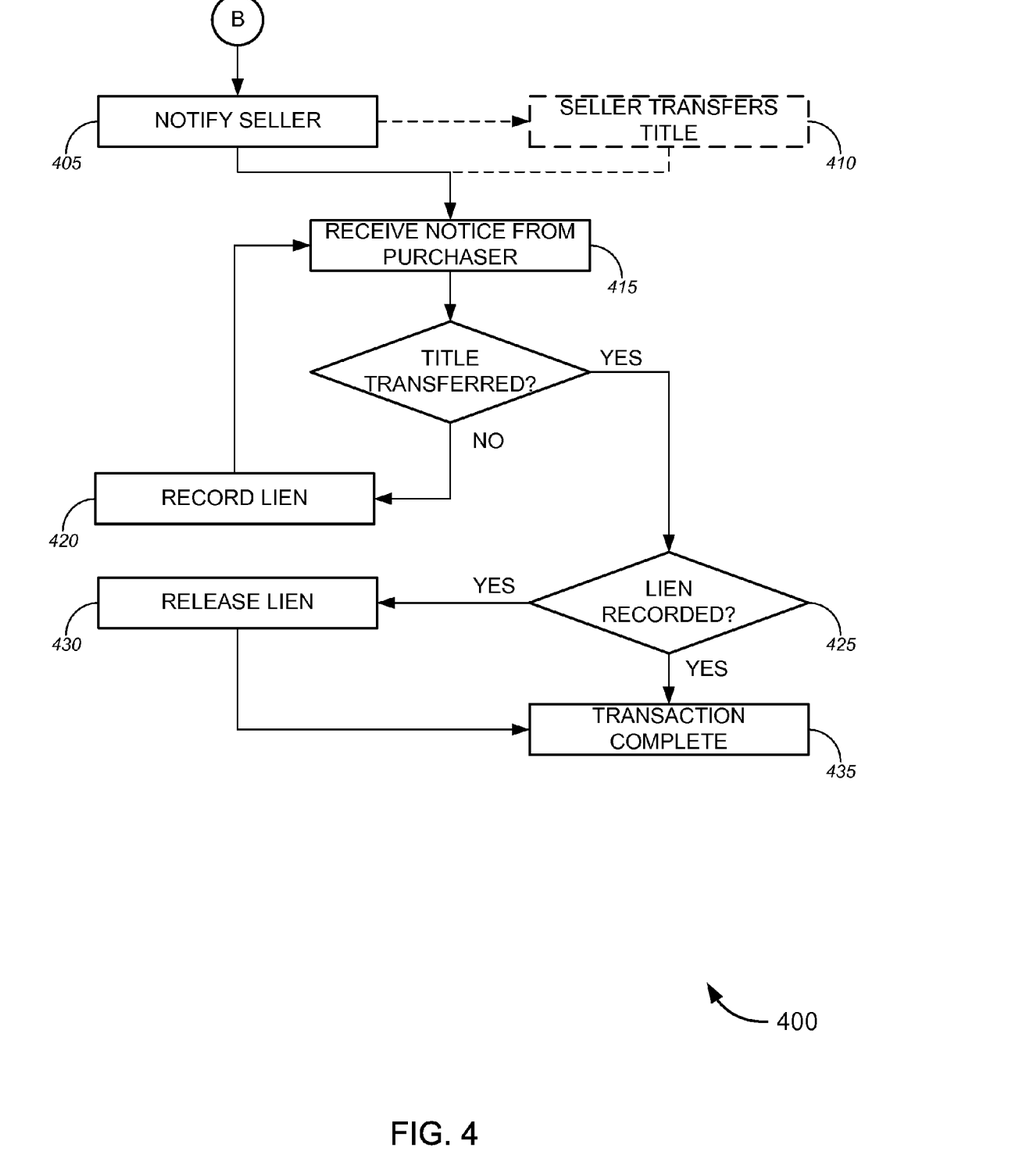
FIG. 4 is a flow diagram illustrating a method of ensuring that a seller transfers title to an item, in accordance with various embodiments of the invention.

FIGS. 2-4 illustrate various methods that can be used to facilitate a transaction between the seller 110 and the purchaser 120. Some or all of the procedures in these methods may be performed by a computer system, such as the computer system operated by the title transfer company 105 described briefly above. It should be appreciated, however, that embodiments of the invention are not limited to any particular structural or architectural hardware implementation.

FIG. 2 illustrates a method 200 of setting up a sales transaction record for a potential transaction, in accordance with one set of embodiments. The method 200 comprises receiving an enrollment transaction from a seller of an item of property (block 205). In one embodiment, the enrollment transaction might comprise a computer transaction involving communication between a property seller and computer system, e.g., via a web server interface, a telephone interface, and/or the like. In another embodiment, the enrollment transaction might be based on a paper form completed by the seller and/or another; information from the paper form might be scanned, keyed and/or otherwise input to the computer system). In yet another embodiment, the enrollment transaction might be a transaction facilitated by an employee or other representative of the title transfer service and/or a third party service facilitator (e.g., at a walk-up location, etc.).

As part of the enrollment transaction, the seller provides data about the transaction, including without limitation an identification of the item to be sold, an identification of the seller, and/or the like. If the item to be sold in the transaction is encumbered with a security interest, the enrollment transaction might comprise a set of data about the security interest. Merely by way of example, if the item is a vehicle that is subject to a security interest arising out of a loan on the vehicle, a set of data about the loan might comprise an identification of the lender that holds the security interest, an amount of the loan, and/or an account number at the lender associated with the loan. In some cases, the enrollment transaction might include obtaining from the seller any required consents, such as a consent to place a lien on the item if the seller does not transfer title pursuant to the transaction, a consent to hold some or all of the seller's proceeds in escrow pending transfer of the title, and/or the like.

In response to receiving the enrollment transaction, the computer system creates a sale transaction record associated with the item to be sold (block 210). The sale transaction record is used by the computer system to track and/or control the sale transaction as described in further detail below, and may be stored in a database maintained by (and/or in communication with) the computer system. In an aspect, the sale transaction record might have associated therewith a transaction identifier, which can be any set of data (such as a string of characters, etc.) that uniquely identifies the sales transaction record within the computer system and thus can be used by various parties to reference that particular sale transaction record. (As used in this context, the terms "unique" and "uniquely" should not be interpreted to mean that the transaction identifier itself necessarily must be unique within the computer system, although that is possible as well. Rather, in some cases, the transaction identifier might be reused, e.g., after some period of time. Hence, in an aspect, the transaction identifier might be universally unique as an identifier within the computer system only when coupled with additional information, such as an identifier of one of the parties to the transaction, a date range, and/or the like.)

This transaction identifier may be provided to the seller (block 215), at the time (or shortly after) the enrollment transaction is processed. Merely by way of example, if the seller fills out a web form to provide information for the enrollment transaction, the transaction may be processed upon the seller posting the web form to the computer system (and/or a web server in communication therewith), and the transaction identifier might be provided as part of a transaction confirmation web page, and/or through some other form of message, such as an email message, a text message, an SMS message, a telephone message, etc.). Alternatively and/or additionally, the transaction identifier might be provided via a telephone interface and/or might be provided to a representative to relay to the seller, perhaps based on the mode of communication used for the enrollment transaction.

If the item is encumbered with a security interest, the method 200 might comprise requesting, from the lienholder, information about an amount remaining of the security interest (e.g., if the security interest secures and/or is related to a loan held by a lender, the method might comprise requesting a remaining amount of the loan from the lender (block 220) and/or receiving, at the computer system, the information about the remaining amount (block 225), which might include, merely by way of example, a principal balance, an accrued interest balance, a payment date, a payoff estimate, an interest rate, and/or the like. These communications may be performed, for example, using and API and/or one or more of the interfaces described above.

Upon completion of this initial processing, the sale transaction record may be placed in a "pending sale notification" status, or the equivalent, (block 230), to indicate that the computer system is awaiting notification from the seller (or another party) that a sale is pending. Merely by way of example, in some embodiments, the sale transaction record includes a status field that is used to indicate the current status of the transaction at any given point in time, and optionally to control the execution of the transaction, as described in further detail below. This status field can contain one of several values (some of which are described in further detail below), and upon completion of the initial processing of the sale transaction record, the value of the status field can be set to "pending sale notification."

FIG. 3 illustrates a method 300 of facilitating a sales transaction of the item and/or the transfer of title to the item. First, the seller finds a purchaser for the item. In one set of embodiments, the transaction facilitation tools of the invention may be implemented in connection with an advertising outlet, such as a used car web site, etc. In such cases, the seller might find the purchaser through advertising on the web site. In other cases, the seller might find the purchaser in any of a variety of conventional ways (e.g., word of mouth, classified advertising, outdoor advertising, etc.). Upon obtaining the purchaser's agreement to a sale price for the item (block 305), the seller may, in some cases, inform the purchaser that the seller intends to use the transaction facilitation tools of the invention to close the sale of the item. Further, the seller may provide the transaction identifier to the purchaser (block 310), e.g., in person, via email, etc., so that the purchaser can access the tools of the invention to check on the status of the transaction, provide information to facilitate the transaction, etc., as described in further detail below.

Upon obtaining agreement on a price, the seller also notifies the computer system that a sale is pending. The notification can be made via a web interface, messaging interface (e.g., email, text message, SMS, voice message, etc.) telephone interface, via a representative, and/or the like. In some cases, the notification includes the sale transaction identifier (so that the computer system can identify the sale transaction record to which the notification applies), and/or some information about the terms of the sale, such as the agreed sale price, the agreed closing date of the sale, and/or the like.

Upon receiving the notification (block 315), the computer system determines that the notification applies to a particular sale transaction record, and if the item to be sold is encumbered, determines a payoff amount of the encumbrance (block 320). In some embodiments, determining the payoff amount might comprise obtaining the payoff amount (or an estimate of the payoff amount) from the lienholder. In other embodiments, determining the payoff amount might comprise calculating the payoff amount, based, for example, on a remaining amount of the amount owing at a certain date prior to the closing date of the sale transaction (for instance, the figure obtained at block 220, above), a closing date of the sale transaction, and/or an interest rate on the amount owing. Formulas for such calculations are known to one skilled in the art and require no further elaboration herein. In some embodiments, the method 300 further comprises communicating the payoff amount to the seller (block 325), e.g., via any of the interfaces described above.

In an aspect of some embodiments, the status of the transaction at this point depends on whether the agreed sale price is greater than the payoff value, so the method 300 might include determining whether the payoff amount is in fact greater than the sale price (block 330). If the payoff amount is not greater than the sale price (perhaps after subtracting any appropriate fees or withholdings), it can be assumed that the seller can obtain (and therefore convey) clear title to the item without any additional funds other than the proceeds of the sale, and the transaction can proceed. Optionally, the status field in the sale transaction record for that transaction may be set to "pending purchaser payment" or the equivalent (block 335), to indicate that the next step in the transaction will be the payment for the item.

On the other hand, if the payoff amount is greater than the agreed sale price, it is likely the seller will not be able to obtain (and therefore will not have the ability to convey) clear title to the item without providing additional funds to the lienholder to pay off the security interest in the item. Accordingly, the computer system places the sale transaction record in a suspended status (e.g., by setting value of the status field in the record to "pending seller payment" or the equivalent) (block 340), to indicate that the sale cannot proceed until the seller has decreased the payoff amount to an amount less than the sale price (e.g., by paying down the encumbrance, providing additional funds for closing, etc.) or some alternative arrangement (as described below, for example) has been made to account for the lienholder's interest and allow for the purchaser to obtain clear title to the item. Optionally, in a set of embodiments, even if the purchaser attempts to pay for the item, the computer system will not accept such a payment until the sale transaction record has been taken out of the suspended status, in order to protect the purchaser from entering into a transaction in which the purchaser may not be able to receive clear title to the item.

In some cases, the computer system may be configured to support alternative arrangements for dealing with a payoff amount. Merely by way of example, in some cases, the purchaser might provide some or all of the payoff amount (e.g., in a situation in which the seller simply wishes to be free of the security interest and is willing to provide title to the purchaser in exchange for the purchaser funding the payoff of the security interest). In other cases, the lienholder might be willing to reduce the payoff amount in order to recover some of the payoff amount without having to attempt to repossess the item. In such cases, these alternative arrangements can be accommodated by restructuring the transaction, based on notifications (and/or payments) from the relevant parties.

After the seller reduces the payoff amount (e.g., as described above) (block 345), the computer system receives a notification that the payoff amount is now less than or equal to the sale price (block 350). This notification might be, in some cases, a confirmation from the lienholder (e.g., via any of the interfaces described above) that the seller has reduced the principal of the amount owing. In other cases, the computer system receives funds in escrow from the seller (perhaps through a payment process similar to that described below) to pay off the difference between the payoff amount and the sale price, so the computer system might generate the notification itself. Other types of notification are possible as well. In any event, once the computer system receives such notification, it removes the suspended status from the sale transaction record, e.g., by setting the status of the record to "pending purchaser payment" or the equivalent (block 335).

If the sale transaction record is not in suspended status, the computer system is prepared, at this point, to receive payment from the purchaser (block 355). In some cases, one of the interfaces described above can be used by the purchaser to request to make a payment. This request might include the transaction identifier, so that the computer system can determine that the payment pertains to a particular sale transaction record, e.g,. by looking up the transaction identifier in the database to determine which record the payment pertains to. In response (perhaps) to receiving this request, the computer system might be configured to receive the payment.

There are a variety of ways in which payment can be received from the purchaser (or from the seller, if, for example, the seller needs to place funds in escrow to make up for a difference between the payoff amount and the sale price, as mentioned above). In an exemplary embodiment, the computer system might provide an interface (such as a web server interface, telephone interface, representative location, kiosk, mobile device interface, etc.) though which the purchaser (or seller, as appropriate) can initiate a money transfer transaction through a money transfer service (which might also be the title transfer service) to provide funds for the sale of the item. The nominal recipient of the transfer might be seller, the title transfer service, etc.

Other payment options might be offered as well. Merely by way of example, funds may be received as a wire transfer, an electronic funds transfer via an ACH, via a card transaction (e.g., credit card transaction, debit card transaction, prepaid card transaction, stored value card transaction, etc.) and/or the like. In a set of embodiments, the computer system can be configured to process any of a variety of such transactions (e.g., by providing a facility, such as a web page or interactive telephone session, via one of the interfaces described above, for the purchaser and/or seller to provide the requisite information—a routing/account number pair, a credit card number, an amount to charge/debit, etc.). In yet another embodiment, receiving the funds might comprise a representative receiving the funds (e.g., via check, credit cards, cash, certified funds, money order etc.) and making a data entry in the computer system to indicate that the funds were received.

After receiving the funds from the purchaser, the computer system distributes the funds appropriately (although in some cases, the computer system might escrow or hold back some or all of the payment to ensure that the title is transferred). Merely by way of example, the computer system might transfer a first portion of the funds to the lienholder (block 360). In an aspect, this first potion of the funds corresponds to the payoff amount of the security interest. Similarly, the computer system might transfer a second portion of the funds to the seller (block 365). This second portion might correspond to a remainder of the funds, after subtracting the payoff amount for the security interest (if one exists) and/or any applicable fees for the title transfer service. By way of example, in a particular aspect, a fee might be charged for the title transfer service. This fee, which might be a flat fee and/or might be calculated based on the sale price of the item, etc. might be deducted from the proceeds transferred to the seller; alternatively, the fee might be charged in a different way, e.g., as an up-front charge at the time of enrollment, as a separate fee to be paid after the transaction has closed, etc. Further, as noted above, in some cases, some or all of the remainder of the funds might be held back from the seller in escrow until the seller transfers title to the item to the purchaser, although, as described below, there are other possible methods for ensuring that title is transferred.

The transfers of funds to the lienholder and/or the seller can be accomplished in a variety of ways, including without limitation those described above. In an exemplary embodiment, for example, the payoff amount might be transferred to the lienholder as a wire transfer, while the remainder might be transferred to the seller as a money transfer transaction, in which the seller can receive cash at a representative location of a money transfer provider (which, as noted above, might be the title transfer service provider itself).

In some embodiments, the computer system is configured to ensure that the seller actually transfers title to the purchaser in completion of the transaction. As noted above, one procedure for ensuring the transfer of the title is to hold some or all of the seller's proceeds in escrow pending the transfer. In some cases, however, this might be undesirable for a variety of reasons. Hence, FIG. 4 illustrates another method 400 of ensuring that the seller does in fact transfer title to the purchaser. In a set of embodiments, the method 400 includes notifying the seller that the purchaser's payment has been received, and/or accordingly, that title to the item should be transferred to the purchaser (block 405). In some embodiments, this notification might simply be the transfer to the seller of the seller's portion of the purchaser's payment. In other cases, an express notification may be provided, e.g., via an email message, text message, SMS message, letter, telephone call, web page, etc. informing the seller that payment for the item has been received and/or that the seller should transfer title to the purchaser.

In an ideal case, the seller then transfers title to the purchaser (block 410). It should be appreciated that the method of transferring title to the purchaser may vary with the nature of the item being sold and/or the jurisdiction in which the item is sold. Merely by way of example, in many states, transfer of title to a vehicle is accomplished by the seller endorsing the formal title document to the purchaser and providing the document to the purchaser. For other types of property, however, transferring title might comprise merely transferring possession of the property, recording a document with a governmental authority, and/or the like.

Certain embodiments of the invention provide additional services to facilitate the transfer of title. Merely by way of example, the computer system might be configured to facilitate the titling and/or registration of the item (especially in the cases of vehicles and other registerable items) by submitting (either electronically and/or on paper) the appropriate paperwork with the necessary governmental entities. For instance, the computer system might be configured to perform a vehicle registration process to register the vehicle in the home state of the purchaser. (Necessary funds for this process, as well as an appropriate transaction fee, may be obtained from the purchaser, and/or deducted from the proceeds provide to the seller). As another example, in the sale of a vehicle, some states require the seller to provide documentation to release liability for the vehicle after the vehicle has been sold—the computer system might be configured to perform and/or facilitate these procedures as well. As yet another example, the computer system might be configured to perform and/or facilitate a process in which a lien recorded with a governmental entity is released.

In similar fashion, the computer may be configured to perform and/or facilitate a variety of types of interactions with appropriate governmental entities. Accordingly, in one set of embodiments, the computer system is provided with logic and/or data necessary to determine the nature of any such requirements for identifying a governmental entity that should receive communication regarding the transaction, determining a set of requirements for communicating with the governmental entity (depending, in many cases, on the respective jurisdictions of the parties to the transaction), and providing for communication with the governmental entity regarding the transaction. In some cases, providing for this communication might comprise performing the communication itself. In other cases, providing for the communication might comprise providing one or more pre-printed and/or filled-out forms to one or more parties of the transaction (along with, optionally, instructions for sending the forms to the appropriate governmental entity or entities).

At block 415, the computer receives a notification from the purchaser (e.g., via any of the interfaces described above) about the status of the title to the item. If the notification indicates that the seller has not transferred title to the purchaser, the method 400 may comprise recording a lien against the item with an appropriate governmental entity (block 420). Procedures for recording a lien against an item of property generally vary by the type of property and the jurisdiction and will not be described in detail herein, but are easily ascertainable by one skilled in the art. (In some cases, the seller's prior consent might be required to obtain a lien on the property, and in such cases, the seller might be required to provide such consent, for example, during the enrollment transaction and/or prior to receiving the seller's portion of the purchaser's payment.) Once the seller actually transfers title to the item, the purchaser might provide an additional notification to the computer system (block 415), indicating that the status of the title has changed. Alternatively and/or additionally, as noted above, some or all of the seller's portion of the purchaser's payment might be held in escrow by the title transfer service pending the transfer of title, rendering the recordation of a lien unnecessary.

On the other hand, if the notification from the purchaser indicates that title to the item has been transferred by the seller, the computer system may determine whether a lien against the item was recorded earlier (e.g., in response to an earlier notification from the purchaser that the seller had not transferred title to the item), and if so, undertake the appropriate procedures to release the lien (block 430). As with recording a lien, the specific procedures for releasing a lien generally will vary with the type of item and the jurisdiction, and are not discussed in detail herein but are within the knowledge of one skilled in the art. Once the lien has been released (or if no lien exists), the computer system marks the transaction as complete (e.g., by updating a status field in the sale transaction record to that effect) (block 435), and optionally provides notification to the purchaser, seller and/or lienholder that the transaction has been completed.

While the exemplary methods 200, 300 and 400 have been described with respect to various parties performing certain notifications, transactions, and the like, it should be appreciated that substantial variation is possible within the scope of the invention. Merely by way of example, in some cases, the purchaser (rather than the seller) might initially perform an enrollment transaction, either as part of a contemplated sale transaction with a known seller, or as part of a "want ad" for a particular item (or type of item) of property. In such embodiments, the transaction identifier might be provided to the purchaser, who then could provide it to the seller. Similarly, the purchaser might notify seller of the user of the tools of the invention, notify the computer system that the sale is pending and/or the like. Hence, it should be appreciated that many of the interactions described as taking place between the seller and the computer system might in fact take place between the purchaser and the computer system (and vice-versa, as appropriate).

FIG. 5 provides a schematic illustration of one embodiment of a computer system 500 that can perform the methods of the invention and/or the functions of various devices (including a host computer, for example) described herein. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner. The computer system 500 is shown comprising hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 500 might also include a communications subsystem 530; which can include without limitation a modem, a telephone interface (e.g. a voice response unit ("VRU")), a network card (wireless or wired), an infra-red communication device, and/or the like, a wireless communication device and/or chipset (such as a Bluetooth™ device, an 802.11 device, a WiFi device, a WiMax device, cellular communication facilities, etc.). The communications system 530 may permit data to be exchanged with a network (such as the network 410 described below, and/or any other devices described herein). In many embodiments, the computer system 500 will further comprise a memory 535, which can include a RAM or ROM device, as described above.

The computer system 500 also can comprise software elements, shown as being currently located within the working memory 535, including an operating system 540 and/or other code 545, such as one or more application programs (e.g., a web server application, which can provide a web server interface in accordance with embodiments of the invention). In addition, the application programs may comprise computer programs of the invention and/or may be designed to implement methods of the invention, as described herein. Merely by way of example, one or more procedures described with respect to the method(s) discussed above might be implemented as instructions executable by a computer (and/or a processor within a computer). A set of these instructions might be stored on a computer-readable storage medium, such as the storage device(s) 525 described above. In some cases, the storage medium might be incorporated within a computer system, such that the instructions, when executed by the computer system, perform the procedures of the method(s). In other embodiments, the storage medium might be separate from a computer system (i.e., a removable medium, such as a compact disc, etc.), such that the storage medium can be used to program a generic computer with the instructions stored thereon.

It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

A set of embodiments comprises systems for facilitating title transfers. Merely by way of example, FIG. 6 illustrates a schematic diagram of a system 600 that can be used in accordance with one set of embodiments. The system 600 can include one or more user computers 605, which can be used by a purchaser, seller, lienholder, title transfer service representative, etc. to communicate in accordance with embodiments of the invention, as well as an interface to various server computers and/or host computers described herein. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 605 can also have any of a variety of applications, including one or more applications configured to perform methods of the invention, such as transaction processing applications, web browser and/or web server applications, and/or the like. Alternatively, the user computers 605 can be any other electronic device, such as a thin-client computer, Internet-enabled mobile telephone, and/or personal digital assistant, capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615 (one or more of which may serve as a host computer, as described above). Each of the server computers 615 may be configured with an operating system including without limitation any of those discussed above, as well as any commercially-available server operating systems, minicomputer operating systems and/or mainframe operating systems. Each of the servers 615 may also be running one or more applications, which can be configured to provide services in furtherance of embodiments of the invention, including without limitation performance of methods of the invention (and/or various operations thereof), as well as traditional transaction processing and/or banking operations.

Merely by way of example, one of the host computers 615 may incorporate, and/or may be in communication with a web server, which can be used, merely by way of example, to provide a web server interface in accordance with embodiments of the invention (e.g., to process requests for web pages and/or other electronic documents from user computers 605 and to transmit web pages and/or other electronic documents to the user computers 605 as appropriate).

In certain embodiments, the system can include one or more databases 620, which can be used to store sale transaction records, as well as perform other transaction processing (e.g., ACH transactions, credit card transactions, money transfer transactions, etc.) in accordance with embodiments of the invention. The location of the database(s) 620 is discretionary: merely by way of example, a database 620a might reside on a storage medium local to (and/or resident in) a host computer 615a. Alternatively and/or additionally, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. In a set of embodiments, a database 620 can be used to store information about transactions processed by the host computers 615, and in particular can comprise one or more tables used to store data in accordance with embodiments of the invention.

While the invention has been described with respect to exemplary embodiments, one skilled in the art will recognize, based on the disclosure herein, that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. In a relationship between a seller of a vehicle, a lender that holds a security interest in the vehicle, and a purchaser of the vehicle, a method of facilitating a sale of the vehicle, the method comprising:

providing a web server interface in communication with a computer, the web server interface being configured to receive communications from the seller and the purchaser;

receiving, at the computer and via the web server interface, an enrollment transaction from the seller, the enrollment transaction comprising a set of data about a loan related to the security interest on the vehicle, wherein the set of data comprises an identification of the lender and an account number associated with the loan;

creating, based on the enrollment transaction, a sale transaction record associated with the vehicle;

providing to the seller, via the web server interface, a transaction identifier associated with the sale transaction record;

requesting, from the lender, information about a remaining amount of the loan; receiving, at the computer, the information about the remaining amount of the loan;

receiving, at the computer and via the web server interface, a notification from the seller that a sale of the vehicle is pending, wherein the notification comprises the transaction identifier, a sale price, and a closing date for the sale;

determining, based on the transaction identifier, that the notification pertains to the sale transaction record;

calculating, at the computer, a loan payoff amount, based at least in part on the remaining amount of the loan and the closing date of the sale;

communicating the loan payoff amount to the seller;

determining whether the loan payoff amount is greater than the sale price;

if the loan payoff amount is greater than the sale price, placing the sale transaction record in suspended status until receiving confirmation from the lender that the loan remaining amount is less than the sale price;

receiving, at the computer and via the web server interface, a request from the purchaser to make a payment, the request comprising the transaction identifier;

determining, based on the transaction identifier, that the request pertains to the sale transaction record;

if the sale transaction record is not in suspended status, providing, through the web server interface, a facility for the purchaser to initiate a money transfer transaction through a money transfer service to provide funds for the sale of the vehicle;

receiving the funds at the computer;

transferring a first portion the funds to the lender;

transferring a second portion of the funds to the seller;

notifying the seller that title to the vehicle should be transferred to the purchaser;

receiving, at the computer and via the web server interface, a notification from the purchaser about a status of title to the vehicle;

recording a lien on the vehicle, if the notification from the purchaser indicates that the title to the vehicle has not been transferred.

2. In a relationship between a seller of a item, a security holder that holds a security interest in the item, and a purchaser of the item, a method of facilitating a sale of the item, the method comprising:

receiving, at a computer, an enrollment transaction from the seller, the enrollment transaction comprising a set of data about an amount owing related to the security interest on the item;

creating, based on the enrollment transaction, a sale transaction record associated with the item;

receiving, at the computer, a notification from the seller that a sale of the item is pending;

determining, at the computer, a payoff amount for the security interest;

receiving, at the computer, funds from the purchaser, in response to a determination that the payoff amount is not greater than the sale price;

transferring at least a first portion the funds to the security holder; and notifying the seller that title to the item should be transferred to the purchaser.

3. The method of claim 2, wherein the item is a vehicle.

4. The method of claim 2, wherein the item is an item of personal property.

5. The method of claim 2, wherein notifying the seller that title to the property should be transferred comprises transferring a second portion of the funds to the seller.

6. The method of claim 2, further comprising:
providing a web interface for communication between the computer and the seller.

7. The method of claim 2, further comprising:
providing a telephone interface for communication between the computer and the seller.

8. The method of claim 2, further comprising, receiving, at the computer, an identification of the security holder and an account number associated with the amount owing.

9. The method of claim 8, wherein the set of data about the amount owing comprises the identification of the security holder and the account number associated with the amount owing.

10. The method of claim 8, wherein determining a payoff amount comprises obtaining from the security holder an estimate of the payoff amount.

11. The method of claim 8, wherein determining a payoff amount comprises calculating, at the computer, the payoff amount.

12. The method of claim 11, wherein calculating the payoff amount comprises:
obtaining, from the security holder, an indication of an amount remaining, at a specified date, of the amount owing; and
calculating the payoff amount based on the amount remaining and a sale closing date provided by the seller.

13. The method of claim 2, further comprising communicating with the seller regarding the payoff amount.

14. The method of claim 2, wherein receiving funds at the computer comprises providing a web server interface for the purchaser to provide information for obtaining the funds.

15. The method of claim 2, wherein receiving funds at the computer comprises receiving a money transfer transaction from the purchaser to the seller.

16. The method of claim 2, wherein receiving the funds at the computer comprises receiving an electronic funds transfer via an automated clearinghouse ("ACH").

17. The method of claim 2, wherein receiving the funds at the computer comprises receiving, at the computer, a data entry from a representative indicating that funds were received from the purchaser.

18. The method of claim 2, wherein receiving the funds at the computer comprises processing a credit card transaction from the purchaser.

19. The method of claim 2, further comprising:
determining that the payoff amount is greater than the sale price; and
placing the sale transaction record in a suspended status in response to a determination that the payoff amount is greater than the sale price, wherein the funds cannot be received from the purchaser when the sale transaction is in a suspended status.

20. The method of claim 19, further comprising:
receiving confirmation that the payoff amount has been reduced to an amount not greater than the sale price; and
in response to the confirmation, removing the suspended status from the sale transaction record;
wherein the determination that the payoff amount is not greater than the sale price is based on the confirmation.

21. The method of claim 2, further comprising:
receiving, at the computer, a notification from the purchaser about a status of title to the property.

22. The method of claim 21, further comprising:
placing the sales transaction record in a closed status, if the notification from the purchaser indicates that title to the item has been transferred to the purchaser.

23. The method of claim 21, further comprising:
recording a lien on the item if the notification from the purchaser indicates that title to the item has not been transferred to the purchaser.

24. The method of claim 2, further comprising:
identifying a governmental entity that should receive communication regarding the sale of the item;
determining a set of requirements for communicating with the governmental entity; and
providing for communication with the governmental entity regarding the sale of the item.

25. The method of claim 2, wherein the determination that the payoff amount is not greater than the sale price is made at the computer.

26. In a relationship between a seller of a item, a security holder that holds a security interest in the item, and a purchaser of the item, a system for facilitating a sale of the item, the system comprising:
- one or more processors; and
- a computer readable medium, in communication with the one or more processors, the computer readable medium having embodied thereon a set of instructions executable by the one or more processors, the set of instructions comprising:
  a) instructions to receive an enrollment transaction from the seller, the enrollment transaction comprising a set of data about an amount owing related to the security interest on the item;
  b) instructions to create, based on the enrollment transaction, a sale transaction record associated with the item;
  c) instructions to receive, at the computer, a notification from the seller that a sale of the item is pending;
  d) instructions to determine a payoff amount for the security interest;
  e) instructions to receive funds from the purchaser, in response to a determination that the payoff amount is not greater than the sale price;
  f) instructions to transfer at least a first portion the funds to the security holder; and
  g) instructions to notify the seller that title to the item should be transferred to the purchaser.

27. The system of claim 26, wherein the computer system comprises an interface for providing communication between the computer system and the seller.

28. The system of claim 27, wherein the interface comprises a web server.

29. The system of claim 27, wherein the interface comprises a telephone interface.

30. In a relationship between a seller of a item, a security holder that holds a security interest in the item, and a purchaser of the item, a non-transitory computer readable medium, the non-transitory computer readable medium having embodied thereon a computer program for facilitating a sale of the item, the computer program comprising a set of instructions executable by one or more processors in a computer system, the set of instructions comprising:
- instructions to receive an enrollment transaction from the seller, the enrollment transaction comprising a set of data about an amount owing related to the security interest on the item;
- instructions to create, based on the enrollment transaction, a sale transaction record associated with the item;
- instructions to receive, at the computer, a notification from the seller that a sale of the item is pending;
- instructions to determine a payoff amount for the security interest;
- instructions to receive funds from the purchaser, in response to a determination that the payoff amount is not greater than the sale price;
- instructions to transfer at least a first portion the funds to the security holder; and
- instructions to notify the seller that title to the item should be transferred to the purchaser.

* * * * *